United States Patent
Boskovic et al.

(10) Patent No.: US 7,454,255 B1
(45) Date of Patent: Nov. 18, 2008

(54) METHODS AND APPARATUS FOR SAFE, FAULT-TOLERANT CONTROL OF COMPLEX TECHNICAL SYSTEMS

(75) Inventors: Jovan Boskovic, Winchester, MA (US); Raman K. Mehra, Lexington, MA (US)

(73) Assignee: Scientific Systems Company, Inc., Woburn, MA (US)

( * ) Notice: Subject to any disclaimer, the term of this patent is extended or adjusted under 35 U.S.C. 154(b) by 230 days.

(21) Appl. No.: 10/966,585

(22) Filed: Oct. 15, 2004

Related U.S. Application Data

(60) Provisional application No. 60/528,085, filed on Dec. 9, 2003.

(51) Int. Cl.
G05B 9/02 (2006.01)
B62D 6/00 (2006.01)
B62D 11/00 (2006.01)
B62D 5/04 (2006.01)
B62D 5/00 (2006.01)

(52) U.S. Cl. ......................... 700/79; 180/402; 180/6.2; 180/446; 701/41

(58) Field of Classification Search .................. 700/79
See application file for complete search history.

(56) References Cited

U.S. PATENT DOCUMENTS

| | | | | |
|---|---|---|---|---|
| 6,505,703 | B2* | 1/2003 | Stout et al. .................. | 180/446 |
| 6,729,432 | B1* | 5/2004 | Yao et al. .................... | 180/402 |
| 2002/0161499 | A1* | 10/2002 | Radamis et al. .............. | 701/41 |
| 2003/0019670 | A1* | 1/2003 | Matz et al. ................... | 180/6.2 |
| 2003/0114969 | A1* | 6/2003 | Dominke et al. ............. | 701/41 |
| 2003/0133526 | A1* | 7/2003 | Millsap et al. ............... | 375/354 |
| 2003/0230448 | A1* | 12/2003 | Guldner et al. .............. | 180/402 |

OTHER PUBLICATIONS

Boskovic J.D, Li S.M, Mehra R.K. (2001) Robust Supervisory Fault-Tolerant Flight Control System. pp. 1815-1820.*
Boskovic J.D, Mehra R.K. (2002) Fault Accommodation Using Model Predictive Methods. pp. 5104-5109.*
Boskovic J.D, Mehra R.K (2001) An Adaptive Retrofit Reconfigurable Flight Controller. pp. 1257-1262.*
F. Ahmed-Zaid, P. Ioannou, K. Gousman and R. Rooney, "Accommodation Of Failures in the F-16 Aircraft Using Adaptive Control", IEEE Control Systems Magazine, Jan. 1991, pp. 73-78, vol. 11, No. 1, published by Institute of Electrical and Electronics Engineers, Inc. (IEEE), Piscataway, NJ, USA.
M. Bodson and J. Groszkiewicz, "Multivariable Adaptive Algorithms for Reconfigurable Flight Control", IEEE Transactions on Control Systems Technology, Mar. 1997, pp. 217-229, vol. 5, No. 2, published by Institute of Electrical and Electronics Engineers, Inc. (IEEE), Piscataway, NJ, USA.

(Continued)

*Primary Examiner*—Albert DeCady
*Assistant Examiner*—Sunray R Chang
(74) *Attorney, Agent, or Firm*—Stefano Casadei; David Crosby

(57) ABSTRACT

A system to control a dynamic system, comprising actuators, sensors, a control module and a plurality of observers to monitor the state of the actuators is disclosed. Certain embodiments of the invention comprise a global failure detection and identification module, a baseline controller, and a retrofit controller. Methods to control the dynamic system are disclosed. Some of the methods utilize a second-order mathematical model of the dynamics of the actuators. In some embodiments, this mathematical model is parameterized by a loss-of-effectiveness (LOE) parameter and a lock-in-place (LIP) parameter. The method may further comprise the step of detecting disturbance conditions and structural damage conditions.

17 Claims, 4 Drawing Sheets

OTHER PUBLICATIONS

J. Brinker and K. Wise, "Reconfigurable Flight Control of a Tailless Advanced Fighter Aircraft", Proceedings of the 1998 AIAA Guidance, Navigation and Control Conference, pp. 75-87, published by the American Institute of Aeronautics and Astronautics (AIAA), Reston, VA, USA.

A. Calise, S. Lee and M. Sharma, "Direct Adaptive Reconfigurable Control of a Tailless Fighter Aircraft", Proceedings of the 1998 AIAA Guidance, Navigation and Control Confer Boston, MA, Aug. 10-12, 1998, vol. 1, pp. 88-97, published by the American Institute of Aeronautics and Astronautics (AIAA), Reston, VA, USA.

J. D. Boskovic and R. K. Mehra, "Robust Fault-Tolerant Control Design for Aircraft Under State-Dependent Disturbances", in Proceedings of the 2003 AIAA Guidance, Navigatio Austin, TX, Aug. 11-14, 2003, published by the American Institute of Aeronautics and Astronautics (AIAA), Reston, VA, USA.

J. D. Boskovic and R. K. Mehra, "An Adaptive Retrofit Reconfigurable Flight Controller", in Proceedings of the 2002 Conference on Decision and Control, Las Vegas, Nevada, Dec. 10-13, 2002, published by Institute of Electrical and Electronics Engineers, Inc. (IEEE), Piscataway, NJ, USA.

J. D. Boskovic and R. K. Mehra, "A Multiple Model Adaptive Flight Control Scheme for Accommodation of Actuator Failures", AIAA Journal of Guidance, Control, Jul.-Aug. 2002 pp. 712-724, & Dynamics, vol. 25, No. 4, published by the American Institute of Aeronautics and Astronautics (AIAA), Reston, VA, USA.

J. D. Boskovic and R. K. Mehra, "A Decentralized Scheme for Autonomous Compensation of Multiple Simultaneous Flight-Critical Failures", in Proceedings of the 2002 AIAA Guida Navigation and Control Conference, Monterey, California, Aug. 5-8, 2002, published by the American Institute of Aeronautics and Astronautics (AIAA), Reston, VA, USA.

J. D. Boskovic and R. K. Mehra, "Fault Accommodation Using Model Predictive Methods", in Proceedings of the 2002 American Control Conference, Anchorage, Alaska, ings of the 2002 American Control Conference, Anchorage, Alaska, May 8-10, 2002, published by the American Automatic Control Council (AACC), Evanston, IL, USA.

J. D. Boskovic and R. K. Mehra, "An Adaptive Scheme for Compensation of Loss of Effectiveness of Flight Control Effectors", in Proceedings of the 40th IEEE Conference on Decision and Control, Orlando, FL, Dec. 2001, published by Institute of Electrical and Electronics Engineers, Inc. (IEEE), Piscataway, NJ, USA.

J. D. Boskovic and R. K. Mehra, "A Robust Adaptive Reconfigurable Flight Control Scheme for Accommodation of Control Effector Failures", in Proceedings of the 2001 American Control Conference, pp. 1127-1132, Arlington, VA, Jun. 25-27, 2001, published by the American Automatic Control Council (AACC), Evanston.

J. D. Boskovic, S.-M. Li and R. K. Mehra, "Evaluation of the Properties of a Multiple-Model Reconfigurable Flight Controller on a 6 DOF Simulation", in Proceedings of the 2000 AIAA Guidance, Navigation and Control (GNC) Conference, Denver, CO, Aug. 2000, published by the American Institute of Aeronautics and Astronautics (AIAA), Reston, VA.

J. D. Boskovic and R. K. Mehra, "Intelligent Adaptive Control of a Tailless Advanced Fighter Aircraft under Wing Damage", AIAA Journal of Guidance, Control & Dynamics, Sep.-Oct. 2000, pp. 876-884, vol. 23, No. 5, published by the American Institute of Aeronautics and Astronautics (AIAA), Reston, VA, USA.

J. D. Boskovic and R. K. Mehra, "Stable Multiple Model Adaptive Flight Control for Accommodation of a Large Class of Control Effector Failures", in Proceedings of the 1999 American Control Conference, pp. 1920-1924, San Diego, CA, Jun. 1999, published by the American Automatic Control Council (AACC), Evanston, IL, USA.

J. D. Boskovic Sai-Ming Li, and R. K. Mehra, "Robust Supervisory Fault-Tolerant Flight Control System", Proc. of the Am. Control Conf., Arlington, VA, Jun. 25-27, 2001.

* cited by examiner

METHODS AND APPARATUS FOR SAFE, FAULT-TOLERANT CONTROL OF COMPLEX TECHNICAL SYSTEMS

CROSS REFERENCE TO RELATED APPLICATIONS

This application claims the benefit of U.S. Provisional Patent Application No. 60/528,085, filed Dec. 9, 2003, entitled "Methods and apparatus for safe, fault-tolerant control of complex technical systems".

FIELD OF THE INVENTION

The invention relates to the field of Fault Tolerant Control Systems (FTCS), including the fields of Failure Detection and Identification (FDI) and Adaptive Reconfigurable Control (ARC). In particular, the invention relates to an adaptive, reconfigurable retrofit control system that may be implemented in conjunction with a baseline control system.

BACKGROUND OF THE INVENTION

Contemporary technical systems such as processing or power plants, aerial and space vehicles, and air traffic management system are characterized by a large number of highly complex and interconnected subsystems. A typical complex system consists of a large number of subsystems and components such as sensors, actuators, power supplies, and control computers. All these components and subsystems are prone to failures either due to the wear and tear, or due to manufacturing flaws or improper usage. Failures or other faults in such subsystem or components, if not properly accommodated for, may lead to catastrophic consequences. Hardware redundancy is one way in which the deleterious effect of faults and failures on the system performance can be prevented. The resulting system consists of double, triple, or quadruple redundant sensors, actuators and control computers which substantially increases costs of the system. For this reason the concept of software redundancy, also referred to as the analytic redundancy has attracted a lot of attention in different areas of engineering. The realted techniques have been shown to be able to compensate for actuator faults and failures by redistributing the control effort among the healthy actuators, and using healthy sensors to infer the measurements from failed sensors. This concept has found particularly fertile ground in the area of flight control.

An important aspect of aviation safety for manned aircraft and Intelligent Autonomy for Unmanned Aerial Vehicles (UAV) is on-line Failure Detection, Identification and Reconfiguration (FDIR) whose role is to quickly and accurately detect and identify subsystem and/or component failures, distinguish between failures and disturbances, and achieve effective control reconfiguration that maintains the performance of the vehicle close to the desired one. While there are many results available regarding detection, identification and accommodation of different types of failures and upsets, there have been virtually no attempts to arrive at a fully integrated Fault Management System (FMS) that would constantly monitor the vehicle's health and take appropriate actions in the presence of many different types of failures and disturbances even when they occur simultaneously. Current approach to this problem is to design separately FDIR systems for sensors failures, control effector or actuator failures, and structural damage, and integrate them with the reconfigurable controller. Due to the heterogeneous nature of such a system, its Verification and Validation (V&V) is often a tedious process of demonstrating that the system will achieve the desired performance under a variety of circumstances. Hence there is a need to develop a fully functional modular FDIR system whose design is integrated from the outset so that the FDI algorithms for a large number of different failures and upsets are developed in concert with the reconfigurable control laws. This enables easy integration, guarantees certain properties of the overall system, and, consequently, simplifies its V&V process.

Substantial development time and cost is involved in the certification of flight control software for aircraft. Current software validation and verification methods used during the certification process are based on extensive and tedious computer simulations of the flight control algorithms on high-fidelity piloted aircraft simulators in different flight regimes. While this high level of development time and cost may be acceptable during the development of a new aircraft, it is often difficult to justify during upgrades to an existing aircraft. As a result, in many cases only incremental changes to flight control software are considered when upgrading an aircraft and/or software. Confining the scope of changes in this fashion shortens the time and cost associated with validation, verification, and certification while still assuring that flight control system and aircraft will perform as desired. In contrast, implementing completely new control algorithms for existing aircraft would require the corresponding control software to repeat the entire validation, verification, and software certification process.

Existing failure detection, identification and reconfiguration (FDIR) techniques for technical systems often involve control systems having two main subsystems, namely, a failure detection and identification (FDI) subsystem and a reconfigurable control subsystem that can be either adaptive or non-adaptive. In many situations it is beneficial to retain the original nominal or baseline controller whose design has evolved over long periods of time, and which achieves desired control objectives in the nominal (i.e., no failure/fault/damage) case while upgrading the reconfigurable controller. In such situations, the reconfigurable controller may be implemented as a retrofit module (i.e., as an add-on signal) that enables the designer to retain the nominal baseline controller designed for the no-failure/fault/damage case, even while achieving all the benefits of adaptive reconfigurable control for failure/fault/damage accommodation.

Even though the idea of retrofit control is appealing due to the ability to retain a "trusted" baseline controller, work in this area in the context of FDIR has been limited. Existing approaches tend, for example, to assume that the failures are described by a constant vector. This substantially narrows the class of failures that can be handled, since many failures result in perturbations that can be described as both time-varying and/or state dependent disturbances.

Some approaches utilize on-line estimation of a large number of parameters, which are used in the reconfigurable control law. These approaches may not be viable as a practical matter, and in any case, verification and validation of such systems represents a formidable problem. In addition, on-line adjustment of a large number of parameters inevitably slows down the failure detection and identification process, which may result in performance deterioration and system instability.

PRIOR ART

On-line FDI and adaptive reconfigurable control has been an area of active research. For instance, in the area of flight control, several techniques have been developed and some of them have been flight tested [3] [7] [8]. Direct adaptive reconfigurable control algorithms that use feed-forward neural networks for failure compensation were developed in [4] and used by Boeing under the RESTORE program [8] [3]. These algorithms were tested under a limited number of single failure cases through flight tests of X-36 UAV. Indirect adaptive control has been used in the context of FDIR in [7] [2][5] where a large number of parameters was adjusted to achieve the objective, resulting in slow FDI and transients during control reconfiguration. FDIR algorithms based on the concept of Multiple Models, Switching and Tuning (MMST) were developed in [22] [13], and indirect adaptive control-based FDIR algorithms that adjust only a few estimates of failure-related parameters were developed in [15] [10]. Both types of algorithms can handle both Lock-In-Place (LIP) and Loss-Of-Effectiveness (LOE) failures. While the MMST-based algorithms are well suited for zero-order actuator dynamics, the algorithms from [15] [10] can handle first-order actuator dynamics. Algorithms from [10] can also reject state-dependent disturbances. References [21] [20][19] describe an indirect adaptive control system for accommodation of wing damage for the Boeing's Tailless Advanced Fighter Aircraft (TAFA). An initial design of the retrofit adaptive reconfigurable controller for control effector failure accommodation is given in [12]. Initial discussion on the design of integrated FDIR systems is given in [9].

Reference [23] describes a patent on a fault tolerant automatic control system utilizing analytic redundancy. The major difference between the said patent and the aparatus and method described here is that the former is well suited for sensor failures only, while the latter addresses the problem of actuator and control effector failures. These are two very different problems since the sensor failure affects only the measurement vector and the corresponding state estimate while the control actuators are intact, and commonly does not destabilize the system even when the failure is not compensated for. On the other hand, the actuator or control effector failures directly affect the plant, and need to be compensated for using the remaining operational actuators or control effectors to maintain the stability of the system. Hence the compensation mechanisms are completely different, and the case of actuator or control effector failures is also much more critical from the system safety point of view since fast control reconfiguration is needed to prevent the performance deterioration and system instability.

DISADVANTAGES OR LIMITATION OF PRIOR ART

The disadvantages of the existing results in the area of aircraft FDIR are:
1. FDI algorithms used thus far are not very fast, and most of them can accurately detect and identify control actuator or effector failures only after an interval of more than 1 second. This is generally not acceptable, particularly in the case of open-loop unstable plants such as tailless UAVs, since very fast detection and identification of failures is needed for successful control reconfiguration.
2. Existing techniques do not take into account actuator dynamics. This results in approximate algorithms that may not be sufficiently accurate and may result in false alarms or missed detections.
3. There are essentially two types of on-line FDIR algorithms: (i) Those based on direct adaptive control, where the controller parameters are adjusted directly based on the response of the overall closed-loop system, and (ii) Indirect adaptive algorithms, where a suitable observer is built to estimate the parameters of the system, and those estimates are in turn used in the adaptive control law. The main disadvantage of the direct adaptive control-based FDIR algorithms is that they are not designed to detect and identify failures and faults explicitly. In both types of algorithms used in the context of FDIR, a very large number of parameters is adjusted on line which may lead to large transients and result in lower tracking accuracy.
4. Existing FDIR algorithms are not well suited for multiple simultaneous failures, failure recoveries, and surface damages. In many situations multiple (almost) simultaneous failures can occur as, for instance, in the case of a fault in the hydraulic system that affects several actuators at the same time. Another problem is related to failure recoveries. Once a failure is accommodated, the control system establishes a new equilibrium (trim) condition that corresponds to the failed aircraft with the reconfigured controller. Any subsequent failure recovery acts as a large disturbance on such a system, and can cause severe performance degradation or instability. Finally, some of the existing algorithms can compensate for damages of flight control surfaces. However, they are not well suited for the case when such damages occur at the same time with other failures.
5. Existing FDIR techniques are not well suited for distinguishing between failures and disturbances which may result in sending wrong information to the pilot or UAV operator.
6. The design of the existing FDIR systems is not integrated from the outset which may lead to undesirable interaction between a heterogeneous collection of subsystems. Verification & Validation (V&V) of such systems in which, in addition, a large number of parameters are adjusted on-line is very difficult if not impossible.

SUMMARY OF THE INVENTION

In one aspect, the present invention relates to adaptive, reconfigurable control systems. In one embodiment, an adaptive reconfigurable control system is implemented in conjunction with a baseline control system. In another embodiment, on-line failure detection and identification, and control system reconfiguration functionality are implemented in a control system. In still another embodiment, an adaptable reconfigurable controller is implemented as a retrofit controller (i.e., producing an add-on signal) that functions in conjunction with a nominal (or baseline) controller. This permits retention of the nominal controller.

In a second aspect, the invention addresses control system performance issues associated with actuator failures, control effector failures, and damage to the system (e.g., an aircraft). By way of example, an actuator failure occurs when a hydraulic cylinder fails while being used to drive (or actuate) a flight control surface (e.g., an elevator).

In various embodiments of the invention, actuators and control effectors are mathematically characterized by second-order dynamics. The second-order dynamics are modeled and parameterized in terms of a small number of failure-related parameters. Characterizing and modeling the actuators in this manner simplifies the design of failure-detection and failure-identification observers and algorithms related to parameter estimation even while accurately describing a large number of failure or fault cases. The modeling techniques contemplated are capable of handling a large set of failure conditions, including Lock-In-Place (LIP, which corresponds to a stuck actuator), Float (which corresponds to an actuator having zero-effectiveness), Hard-Over (which corresponds to the actuator moving to an extreme position regardless of the command provided to the actuator), and Loss-Of-Effectiveness (which corresponds to a condition where the actuator is only partially operational).

In another aspect, the invention addresses control system performance issues in which the resulting failure-detection and failure-identification observers and parameter estimation algorithms achieve very fast detection and identification of failures. The reconfiguration of a control system is also fast, thus assuring that the system will be stable and robust (e.g., from a control design and implementation perspective) and also achieve the desired performance.

In still another aspect, the invention addresses control system performance issues to enable the failure detection and identification system to handle both failures and failure recoveries. Various embodiments of the invention are well suited to perform under conditions in which the plant can be open-loop unstable and has significant actuator dynamics.

In yet another aspect, the invention addresses control system performance issues in a manner in which the retrofit failure detection, identification, and reconfiguration system is active only after a failure. In a no-failure case, the controlled system or process may be controlled by a nominal (or baseline) controller.

Another aspect of the invention involves controlling a dynamic system. A method according to one embodiment involves receiving a signal from a control module, receiving a signal from a dynamic system, producing a modifier (e.g., add-on) signal in response to the control-module signal and the dynamic-system signal, and adding the modifier signal to the control-module signal to control an operation of the dynamic system. The modifier signal may be based on a mathematical model of second-order dynamics of at least one actuator of the dynamic system. For example, the second-order dynamics may represent a failure condition of the at least one actuator.

In another embodiment, a system for modifying a control signal applied to a dynamic system includes a first control module. The first control module is responsive to an output signal of a second control module and an output signal of a dynamic system. In this embodiment, the system also includes a means for combining the output signal of the first control module with the output signal of the second control module to control the dynamic system. The first control module may include a mathematical model of second-order dynamics of at least one actuator of the dynamic system. For example, the second order-dynamics may represent a failure condition of the at least one actuator.

In other aspects of the invention, the present invention provides systems adapted to practice the aspects of the invention set forth above.

OVERALL DESCRIPTION OF A PREFERRED EMBODIMENT

The purpose of the invention is to solve the difficult problem of fast, accurate and robust detection and identification of multiple simultaneous flight control actuator failures and surface damage, and effective reconfiguration of the remaining healthy effectors to achieve the flight performance close to that of the healthy aircraft. The invention is also referred to as the FTCS (Fault Tolerant Control System). The FTCS solves this problem by effectively combining several new and efficient algorithms.

Figure 1:
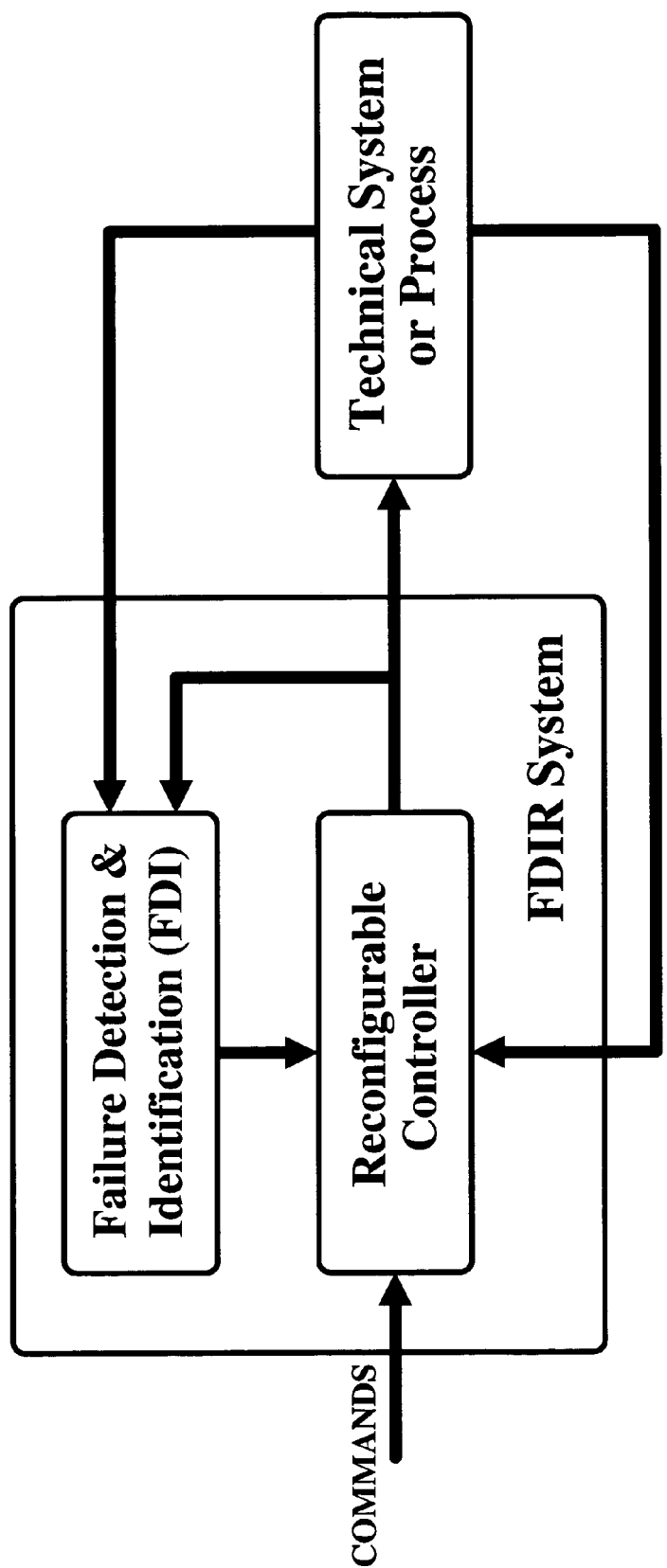
FIG. 1 and FIG. 2 show two embodiments of the invention.

FIG. 1 schematically illustrates a embodiment of a control system according to the invention. This control system includes two modules, namely, a failure detection and identification module and a reconfigurable controller module. Each of the modules can be, for example, adaptive or non-adaptive. In this embodiment, the control system does not include a separate baseline control module.

Figure 2:
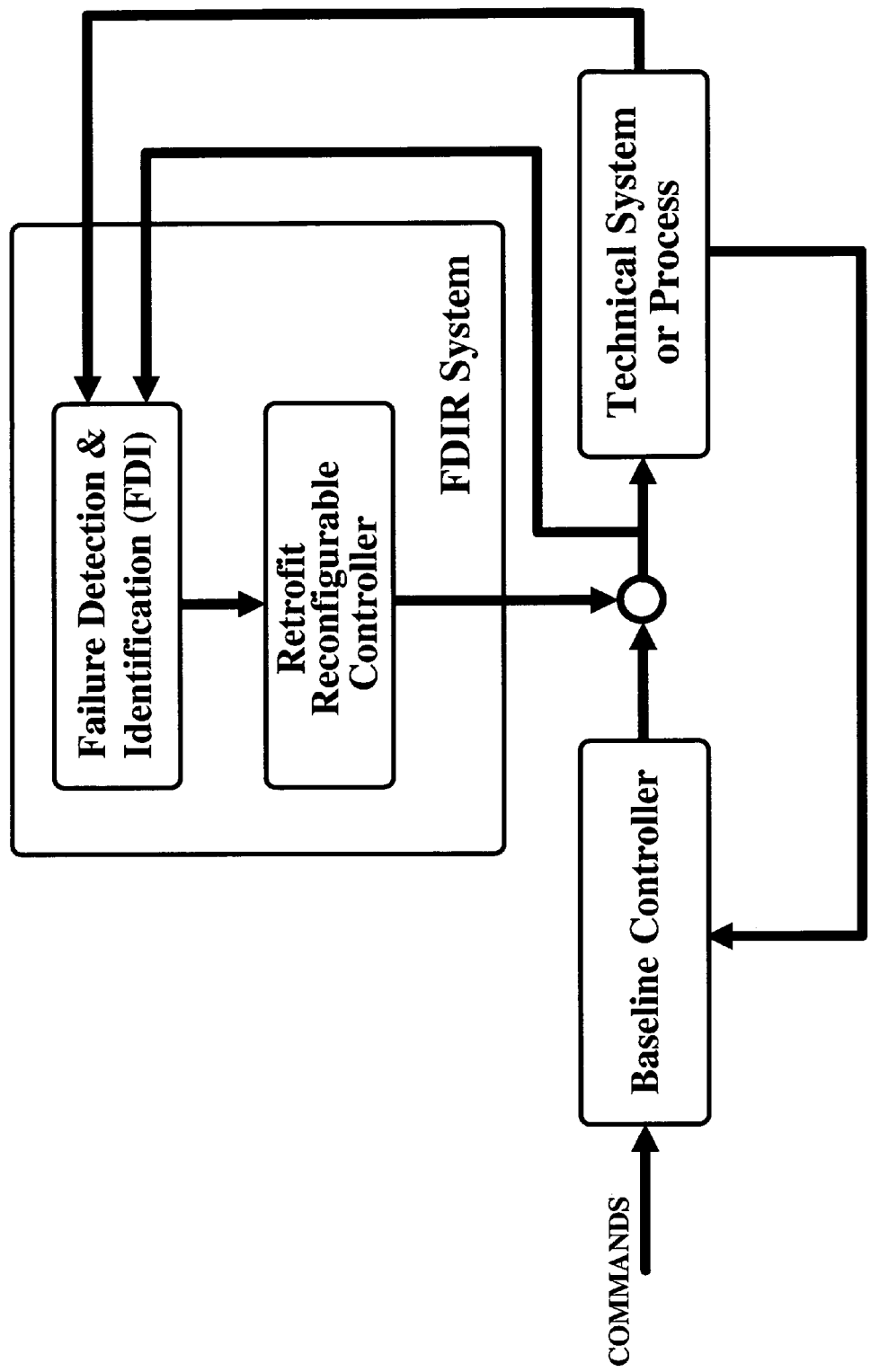

FIG. 2 schematically illustrates another embodiment of a control system according to the invention that does include a separate baseline control module. In this embodiment the baseline control module has been used, for example, over lohg periods of time and provides desirable system performance under conditions in which there are no subsystem or component failures, faults, or damage. In this embodiment a retrofit control module is implemented in conjunction with the baseline control module. In accordance with Eq. 1, the output of the retrofit control module is combined with the output of the baseline control module to control a technical system or process (e.g., an aircraft) to achieve desired performance. The aircraft, for example, performs as desired under conditions in which there are no subsystem or component failures, faults, or damage as well as under conditions in which there are subsystem or component failures, faults, or damage.

Figure 3:
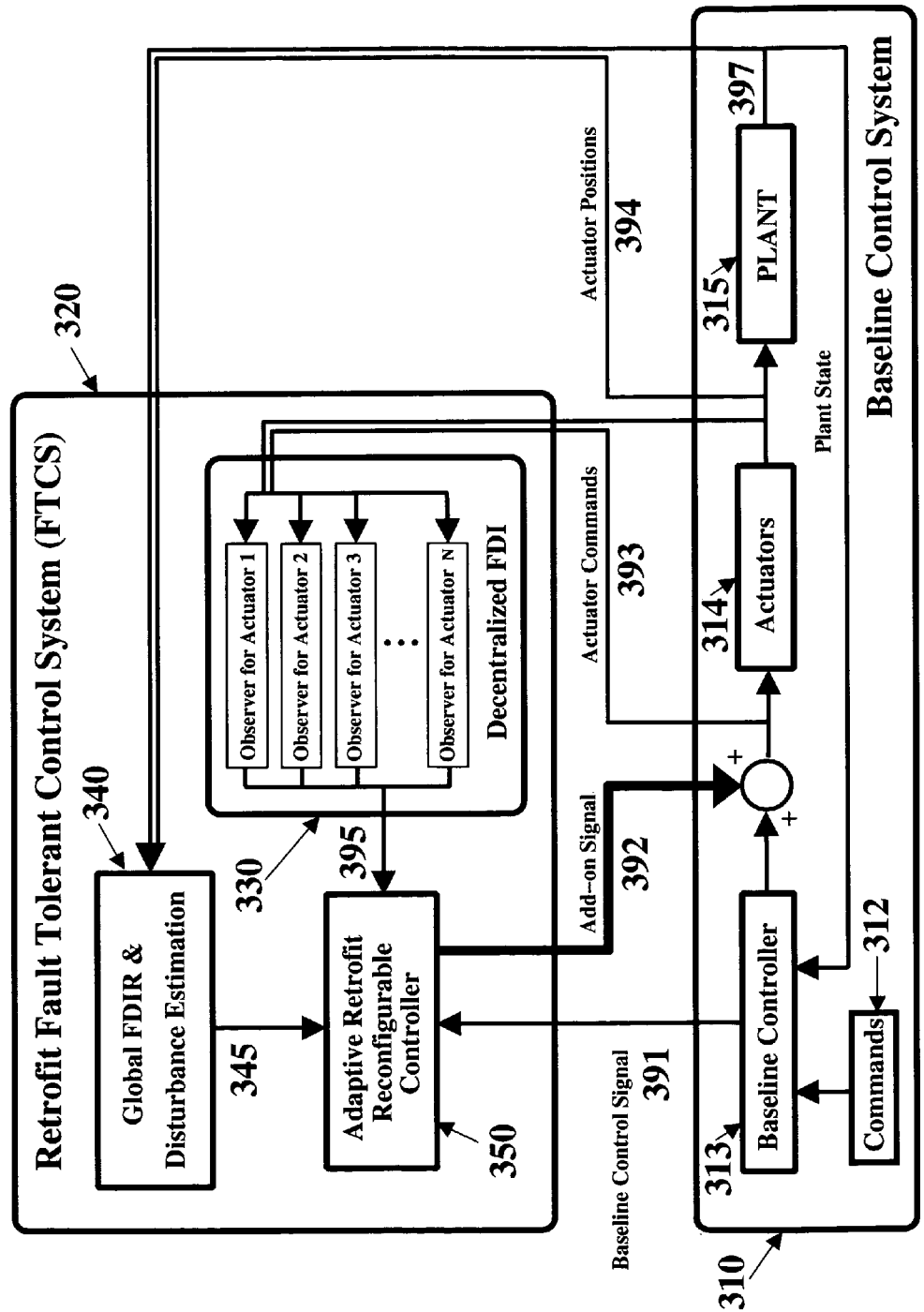
FIG. 3 describes a preferred embodiment of the disclosed invention comprising a baseline controller.

FIG. 3 illustrates a preferred embodiment of the invention. The Fault Tolerant Control System (FTCS) system, block 320, comprises several subsystems described below. Block 330 is the Decentralized FDI (Failure Detection and Identification) system. Its role is to detect and identify different failures of control actuators; the failures include Loss-Of-Effectiveness (LOE), Lock-In-Place (LIP), Hard-over, Float, and Hard-To-Position (HTP). The decentralized FDI system is developed for first and second-order actuator dynamics (see section "Detailed description of preferred embodiment", equations (6)-(8) and accompanying explanations). All other equations that will be mentioned below are from the same section. The key element in the design of FDI observers is the parameterization of failures, given in equations (6)-(8), the corresponding observer equations (see equation (10) for the case of measurable rates, and equation (19) for the case when the rates are not measurable), and adjustment laws for the estimates of the failure-related parameters in the case when the actuator rates are measurable (equations (11), (12), and when only the actuator position is available (equations (20), (21)). The system is decentralized since one FDI observer is run for each of the actuators. Due to this feature, the FDI for each actuator is completely decoupled from the FDI observers for other actuators, which is very important for control reconfiguration. In addition, since only the inputs and outputs of the actuators are used, the FDI procedure does not depend on the operating regime (if the actuator dynamics does not change with the operating regime). Parameterization of the failures in terms of only two failure-related parameters (LIP and LOE coefficients) enables the use of very fast gradient-based adjustment laws for their estimation, resulting in fast and accurate FDI.

Block 340 is the Global FDI subsystem. Its role is to accommodate control surface damages. The related algorithm is described by equations (24) and (25). The algorithm is based on modeling the surface damage as the LOE of the control effectors. Two types of LOE failures can occur: the LOE of the actuator due to a damaged mechanism or fluid leak resulting in lowered effector movement, or the control surface LOE due to damage. The first type, actuator LOE, can be detected by the decentralized FDI algorithm, since it compares the measured actuator position with the commanded one. Damage to the effector that does not change the motion of the actuator cannot be detected in this manner, and the Global FDI needs to be used in this case.

Block 340 also carries out a disturbance rejection function. Control actuator or effector failures can, in most cases, generate state-dependent disturbances acting on the vehicle. To compensate for the effect of such disturbances, the FTCS comprises of a disturbance rejection module. This module is effectively combined with the Global FDI algorithm so that the disturbance estimates are generated from the Global FDI observer. Two algorithms have been interchangeably used for disturbance rejection: (i) The algorithm based on Variable Structure adaptation and (ii) The algorithm based on gradient adaptation. These algorithms are described by equations (28)-(30).

Block 350 is the Adaptive Retrofit Reconfigurable Controller (ARRC). The role of this subsystem is to correct the control signal, generated by the baseline controller, and compensate for the effect of control actuator failures, surface damage, and state-dependent fault-generated disturbances. The ARRC is described in detail by equations (31)-(38).

Functional Operation

Decentralized FDI system (block 330): This system takes the signal 391 generated by the controller 313 and the measured output 394 of the actuators 314, and uses these in the FDI observers in 330, designed based on the dynamics of the actuators, to generate the estimates of the LIP and LOE parameters.

These estimates (signals 395) are fed into 350. The adjustment of the LIP and LOE estimates is carried out based on the error between the measured and estimated actuator outputs.

Global FDI (block 340): This system has the current control signal 394 and the state of the system 397 as the inputs. These signals are used in the Global FDI observer that generates an estimate of the systems states, as well as the estimates of the damage matrix parameters describing surface damage. The damage matrix parameter estimates are adjusted using the error between the estimated and measured state of the system.

Disturbance Rejection (block 340): To achieve effective disturbance rejection, Global FDI observer is augmented by the disturbance estimate term. This estimate is adjusted using the error between the measured and estimated state of the system. Adaptive Retrofit Reconfigurable Controller (ARRC) (block 350): This system collects all the estimates of failure-related parameters (signal 395) and estimates of the disturbance vector and damage matrix parameters (signal 345), and uses them in the retrofit signal (392) that is added to the output of the baseline controller.

Figure 4:
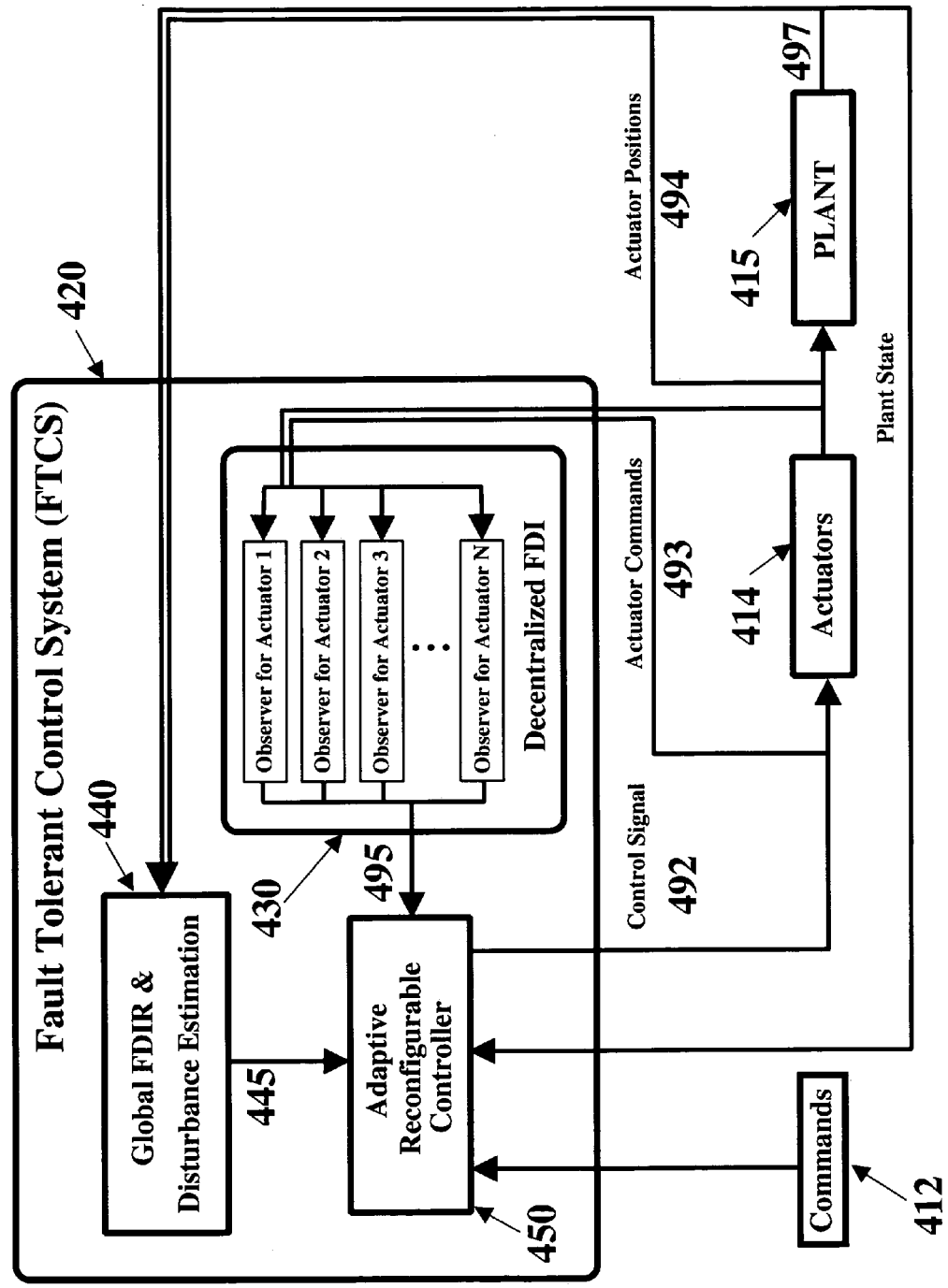
FIG. 4 describes another embodiment of the disclosed invention which does not comprise a baseline controller.

FIG. 4 illustrates another embodiment of the invention in which the Adaptive Retrofit Reconfigurable Controller (ARRC) 450 generates directly the control signals (492), rather than generating an add-on signal as in FIG. 3. The other elements in FIG. 4 are equivalent to the corresponding elements of FIG. 3.

Unique or Novel Features of the Innovation

The FTC system has the following novel or unique features:
1. Since only two parameters are adjusted per actuator, FTC results in very fast and accurate FDI of control actuators. To the best of our knowledge, no other algorithm can detect and identify failures in less than 0.1 sec.
2. It is well suited for multiple simultaneous failures, damages and failure recoveries.
3. It can distinguish between failures and disturbances.
4. Its design is carried out in an integrated manner which enables us to guarantee certain properties of the system (stability, robustness, tracking performance), facilitates its V&V, and avoids undesirable interaction between subsystems.
5. The decentralized FDI which is an integral part of FTC, takes explicitly into account first or second order actuator dynamics.

Advantages of Innovation
1. In some embodiments of the inventions related to flight control it has been shown that pilot overload and possible crashes are prevented by achieving fast and robust FDI and control reconfiguration in the presence of multiple severe critical failures and recoveries and surface damage.
2. Due to its implementation as a retrofit control module, it allows for the baseline controller to be retained. This preserves the desired performance of the system of the original system (for example, some embodiments of the inventions related to flight control have been shown to preserve handling qualities).
3. The invention os not application-specific and can be used to design FTCS in many different areas, including flight control, process control, power system control, autonomous control of Unmanned Aerial Vehicles (UAV), control autonomous ground, under-water and surface vehicles, and other areas.

DETAILED DESCRIPTION OF PREFERRED EMBODIMENT

System Model and Failure Representation

System Dynamics: The invention is concerned with the following class of models of system dynamics:

$$\dot{\chi}_1 = f(\chi) \quad (1)$$

$$\dot{\chi}_2 = f(\chi) + G(\chi)u + \xi(\chi) \quad (2)$$

$$\dot{u} = -\lambda(u - u_c), \quad (3)$$

where $\chi \in \mathbb{R}^n$ denotes the state vector, $\chi_1 \in \mathbb{R}^{(n-p)}$, $\chi_2 \in \mathbb{R}^p$, $\chi = [\chi_1^T \chi_2^T]^T$, $u_c \in \mathbb{R}^m$ and $u \in \mathbb{R}^m$ denote respectively the controller output vector and the plant input vector, $\xi \in \mathbb{R}^p$ denotes an uncertain disturbance vector, and $\lambda \gg 1$ denotes the actuator gain. The system can be open-loop stable or unstable.

The above model is subject to the following assumption:

Assumption 1:

(1) State of the system is measurable;

(2) For a closed bounded set of states $S_\chi$, $G(\chi) G^T(\chi)$ is invertible for all $\chi \in S_\chi$;

(3) $f(\chi)$, $G(\chi)$ and $\xi(\chi)$ are sufficiently smooth functions (functionals) of their argument;

(4) m>p; and (5) $|\xi_i| \leq c_i + d_i \phi_i(\chi)$, where $\phi(\chi) = [(\phi_1(\chi) \phi_2(\chi) \ldots (\phi_p(\chi)]^T$ is a known vector function of the state.

The desired dynamics of the plant is described by the following reference model:

$$\chi_{m1} = A(\chi_m - \chi) + \bar{f}(\chi) \quad (4)$$

$$\chi_{m2} = A_m \chi_m + B_m r; \quad (5)$$

where $\chi_m = [\chi_{m1}^T \ \chi_{m2}^T]^T$ denotes the state of the reference model, $\chi_m \in \mathbb{R}^n$, matrix $A_0 = [\bar{A}^T \ A_m^T]^T$ is asymptotically stable, and $r \in \mathbb{R}^p$ denotes a vector of bounded piece-wise continuous reference inputs.

We introduce the following assumption:

Assumption 2: The state of the reference model is bounded for a set of reference inputs and for $\chi \in S_\chi$.

Actuator and Control Effector Failures: The invention is concerned with the following actuator and control effector failures: include: (i) Lock-In-Place (LIP); (ii) Hard-Over Failure (HOF); (iii) Float; and (iv) Loss of Effectiveness (LOE). These types of control effector failures can be parameterized as follows:

$$u_i(t) = \begin{cases} u_{ci}(t), & k_i(t) = 1, & \text{for all } t \geq 0 & \text{No-Failure Case} \\ k_i(t)u_{ci}(t), & 0 < \epsilon_i \leq k_i(t) < 1, & \text{for all } t \geq t_{Fi} & \text{Loss of Effectiveness} \\ 0, & k_i(t) = 1, & \text{for all } t \geq t_{Fi} & \text{Float Type of Failure} \\ u_{ci}(t_{Fi}), & k_i(t) = 1, & \text{for all } t \geq t_{Fi} & \text{Lock-in-Place Failure} \\ (u_i)_{\min} \text{ or } (u_i)_{\max}, & k_i(t) = 1, & \text{for all } t \geq t_{Fi} & \text{Hard-Over Failure} \end{cases}$$

where $t_{Fi}$ denotes the time instant of failure of the ith effector, $k_i$ denotes its effectiveness coefficient such that $k_i \in [\epsilon_i, 1]$, and $\epsilon_i > 0$ denotes its minimum effectiveness. First-Order Actuator Dynamics: In the case of first-order actuator dynamics, a large class of failures can be modeled by the following model:

$$\dot{u} = -\sigma\lambda(u - ku_c), \quad (6)$$

where u denotes the actuator output; $u_c$ denotes the actuator input; $\lambda > 0$; $\sigma(t) = 1$ in the case of no failure, and $\sigma(t) = 0$, $u(t_F) = \bar{u}$ when the failure occurs at $t = t_F$, where $t_F$ denotes the time of failure. Hence in the case of failure at $t_F$ we have that $\dot{u}(t) = 0$ for $t > t_F$, and $u(t) = U(t_F)$ for all $t > t_F$. In the case of LIP, $U(t_F)$ has the value of $u(t_F^-)$, while in the case of HOF, it jumps to the upper or lower position limit. In the above expression, $k \in [\epsilon, 1]$, where $0 < \epsilon << 1$.

Second-Order Actuator Dynamics: In the case of second-order actuator dynamics, the class of failures under the consideration can be modeled by the following model:

$$\dot{u}_1 = \sigma u_2 \quad (7)$$

$$\dot{u}_2 = -[\lambda_2 + (1-\sigma)\beta]u_2 + \sigma\lambda_1(ku_c - u_1), \quad (8)$$

where $u_1$ is the actuator output and $\beta \geq 0$.

Second-Order Actuator Dynamics with Measurable Rate

Here a description of the algorithms for the second-order actuator dynamics with measurable rate is included.

Observer: To design an observer for the model (7), (8), a derivative of the expression (7) is taken for $\beta = 0$ to obtain:

$$\ddot{u}_1 = \sigma\dot{u}_2$$
$$= -\lambda_2 \dot{u}_1 + \sigma^2 \lambda_1(ku_c - u_1)$$
$$= -\lambda_1.u_1 - \lambda_2\dot{u}_1 + \sigma\lambda_1 ku_c + (1-\sigma)\lambda_1 u_1,$$

where the fact is used that, since $\sigma \in \{0, 1\}$, one has that $\sigma^2 = \sigma$. By letting $\eta_1 = u_1$ amd $\eta_2 = \dot{u}_1$, one now has that:

$$\dot{\eta}_1 = \eta_2$$

$$\dot{\eta}_2 = -\lambda_2\eta_2 + \sigma\lambda_1(ku_c - \eta_1). \quad (9)$$

Since bother unknown parameters are in the second equation of the transformed systems, the observer is now chosen in the form:

$$\dot{\hat{\eta}}_2 = -\lambda_2\eta_2 + \hat{\rho}\lambda_1(\hat{k}u_c - \eta_1) - \tau\hat{e}, \quad (10)$$

where $\tau > 0$, and $\hat{e} = \hat{\eta}_2 - \eta_2$. We let $\omega_\sigma = \hat{k}u_c - \eta_1$ and $\omega_k = u_c$.

Adaptive Adjustment Laws: The following adaptive adjustment laws are chosen to adjust $\hat{\rho}$ and $\hat{k}$:

$$\dot{\hat{\sigma}} = Proj_{[0,1]}\{-\gamma_\sigma \hat{e}\omega_\sigma\}, \quad (11)$$

$$\dot{\hat{k}} = Proj_{[\epsilon,1]}\{-\gamma_k \hat{e}\omega_k\}, \quad (12)$$

where the projection operator is used to keep the parameter estimates within the parameter bounds.

Second-Order Dynamics with Non-Measurable rates

Here we present the algorithm for the case of second-order actuator dynamics with non-measurable rates.

We first define the following variables:

$$u_{iF} = \frac{1}{s+\lambda}u_i, \ i = 1, 2, \quad (13)$$

$$u_{cF} = \frac{1}{s+\lambda}u_c. \quad (14)$$

By using the above definition, from (8), after neglecting exponentially decaying initial conditions, we have:

$$u_2 = \sigma[(\lambda - a_2)u_{2F} + a_1(ku_{cF} - u_{1F})], \quad (15)$$

where $a_1 = \lambda_1$ and $a_2 = \lambda_2$. From (13) and (7), after again neglecting exponentially decaying initial conditions, we have that $$\sigma u_{2F} = \frac{1}{s+\lambda}\sigma u_2 = \frac{1}{s+\lambda}su_1 = u_1 - \lambda u_{1F}. \quad (16)$$

Hence the term on the left hand side is expressed in terms of measurable and obtainable signals $u_1$ and $u_{1F}$.

From (15) we now have:

$$u_2=(\lambda-a_2)(u_1-\lambda u_{1F})+\sigma a_1(ku_{cF}-u_{1F}). \quad (17)$$

We now use (7) to obtain:

$$\dot{u}_1=\sigma(\lambda-a_2)(u_1-\lambda u_{1F})+\sigma a_1(ku_{cF}-u_{1F}), \quad (18)$$

where we used the fact that, since $\sigma \in \{0, 1\}$, we have that $\sigma^2=\sigma$.

Observer: In this case we build the observer as:

$$\dot{\hat{u}}_1=\hat{\sigma}(\lambda-a_2)(u_1-\lambda u_{1F})+\hat{\sigma}a_1(\hat{k}u_{cF}-u_{1F})-\tau(\hat{u}_1-u_1). \quad (19)$$

Let $\hat{e}_1=\hat{u}_1-u_1$, $\phi_\sigma=\hat{\sigma}-\sigma$, $\phi_k=\hat{k}-k$, $\omega_\sigma=(\lambda-a_2)(u_1-\lambda u_{1F})+a_1(ku_{cF}-u_{1F})$, and $\omega_k=a_1 u_{cF}$, Adaptive Adjustment Laws: In this case the following adaptive laws are chosen:

$$\dot{\hat{\sigma}}=Proj_{[0,1]}\{-\gamma_k \hat{e}_1 \omega_k\}, \quad (20)$$

$$\dot{\hat{k}}=Proj_{[\epsilon,1]}\{-\gamma_k \hat{e}_1 \omega_k\}. \quad (21)$$

Global FDI Subsystem

The Global FDI system is concerned with the control surface LOE due to damage.

The system model is of the form:

$$\dot{\chi}_1=f(\chi) \quad (22)$$

$$\dot{\chi}_2=f(\chi)+G(\chi)Du, \quad (23)$$

where D is the matrix of damage parameters, analogous to the K matrix in the decentralized FDI algorithm, and u are the measured actuator positions.

Observer: Since D appears only in the second equation, the observer is designed in the form:

$$\dot{\hat{\chi}}_2=f(\chi)+G(\chi)\hat{D}u-\Lambda(\hat{\chi}_2-\chi_2) \quad (24)$$

Adaptive Adjustment Laws: The adjustment laws for the damage parameter estimates $\hat{d}_i$ are now of the form:

$$\dot{\hat{d}}_i=Proj_{[\epsilon,1]}\{-\gamma_i u_i b_i \hat{e}_i\} \quad (25)$$

where $b_i$ is the transpose of the ith column of the B-matrix, and $\hat{e}=\hat{\chi}_2-\chi_2$. Two tuning parameters are included in this algorithm: $\Lambda$, which controls the speed of the convergence of the observer, and $\Gamma$, which controls the rate of change of $\hat{D}$.

Disturbance Rejection Subsystem

Baseline Controller: This controller assumes that actuator dynamics can be neglected (i.e. $u=u_c$), and that there are no disturbances (i.e. $\xi \equiv 0$):

$$u_c=WG^T(\chi)(G(\chi)WG^T(\chi))^{-1}[-f(\chi)+A_m\chi+B_m r], \quad (26)$$

where $W=W^T>0$ denotes a control allocation matrix. Upon substituting the expression (26) onto (2) we obtain:

$$\dot{\chi}_1=f(\chi)$$

$$\dot{\chi}_2=A_m\chi+B_m r.$$

Upon substituting the reference model equations (4), (5) we obtain:

$$\dot{e}_1=\overline{A}e$$

$$\dot{e}_2=A_m e$$

Since the matrix $A_0=[\overline{A}^T A_m^T]^T$ is asymptotically stable, the above system is stable.

Disturbance Observer: The disturbance observer is of the form:

$$\dot{\hat{\chi}}_1=\overline{A}(\hat{\chi}-\chi)+f(\chi) \quad (27)$$

$$\dot{\hat{\chi}}_2=A_m(\hat{\chi}-\chi)+f(\chi)+G(\chi)u+\hat{\xi}, \quad (28)$$

where $\hat{\xi}$ denotes the estimate of $\xi$. Two algorithms for adjusting $\hat{\xi}$ are presented next.

Variable Structure Adaptation: Let $\hat{e}=\hat{\chi}-\chi$ and $\hat{e}_i=\hat{\chi}_i-\chi_i$, $i=1, 2$ denote the estimation errors. That Variable Structure adjustment law is of the form:

$$\dot{\hat{\xi}}_i = -(c_i + d_i \varphi_i(x))\text{sign}\left(\sum_{j=1}^{n} p_{ji}\hat{e}_j\right), i=1, 2, \ldots, p.$$

Gradient Adaptation: In this case, based on an assumption that $\xi_i(t)$ change slowly and have fixed bounds $\overline{\xi}_i$ such that $|\xi_i| \leq \overline{\xi}_i$, the elements of $\hat{\xi}$ are adjusted using:

$$\dot{\hat{\xi}}_i=Proj_{[-\overline{\xi}_i,\overline{\xi}_i]}\{-\gamma_i \hat{e}_i\}, i=1, 2, \ldots, p, \quad (29)$$

where $\gamma_i>0$.

Disturbance Rejection Controller: The baseline controller is now modified to achieve disturbance rejection as:

$$u_c=WG^T(\chi)(G(\chi)WG^T(\chi))^{-1}[-f(\chi)+A_m\chi+B_m\tau-\hat{\xi}]. \quad (30)$$

Adaptive Retrofit Reconfigurable Controller

ARRC Design for LOE Failures: The objective here is to find a signal $v(t)$ such that, for a given UN(t), the control input applied to the aircraft:

$$u(t)=u_N(t)+v(t), \quad (31)$$

achieves the desired objective.

Assuming that $G(\chi)$ is approximately constant over an interval of interest (i.e $G(\chi) \approx B$), the desired add-on signal is:

$$v^*=K^{-1}(I-K)(u_N-u_N^*). \quad (32)$$

We choose the actual signal as:

$$v=\hat{K}^{-1}(I-\hat{K})(u_N-U_N^*) \quad (33)$$

where $\hat{K}$ denotes the estimate of K.

Alternatively, $v^*$ and $v$ can be chosen as:

$$v^*=K^T B^T(BKK^T B^T)^{-1}B(I-\hat{K})u_N \quad (34)$$

$$v=W\hat{K}^T B^T(B\hat{K}W\hat{K}^T B^T)^{-1}B(I-\hat{K})u_N \quad (35)$$

ARRC Design for LIP Failures: In this case $v^*$ and $v$ are chosen as:

$$v^* = \Sigma^T B^T (B\Sigma\Sigma^T B^T) B(I-\Sigma)(u_N - \bar{u}) \quad (36)$$

$$v = \hat{W}\hat{\Sigma}^T B^T (B\hat{\Sigma}\hat{W}\hat{\Sigma}^T B^T)^{-1} B(I-\hat{\Sigma})(u_N - \bar{u}) \quad (37)$$

ARRC Design for Combined LIP and LOE Failures: Finally, we can combine both derivations to provide the combined LOE-LIP retrofit controller with control allocation:

$$v = \hat{W}\hat{\Sigma}^T \hat{K}^T B^T (B\hat{K}\hat{\Sigma}\hat{W}\hat{\Sigma}^T B^T)^{-1} B[(I-\hat{K}\hat{\Sigma})u_N - \hat{K}(I-\Sigma)\bar{u}] \quad (38)$$

In all cases the elements of the matrices $\hat{\Sigma}$ and $\hat{K}$ are adjusted using the adaptive laws (11) and (12) in the case of measurable rates, or (20) and (21) in the case when the rates are not measurable.

REFERENCES

The following is a list of publications referred to in the current disclosure by means of the corresponding numerals.

[1] F. Ahmed-Zaid, P. Ioannou, K. Gousman and R. Rooney, "Accommodation of Failures in the F-16 Aircraft using Adaptive Control", IEEE Control Systems Magazine, Vol. 11, No. 1, pp. 73-78, January 1991.

[2] M. Bodson and J. Groszkiewicz, "Multivariable Adaptive Algorithms for Reconfigurable Flight Control", IEEE Transactions on Control Systems Technology, Vol. 5, No. 2, pp. 217-229, March 1997.

[3] J. Brinker and K. Wise, "Reconfigurable Flight Control of a Tailless Advanced Fighter Aircraft", Proceedings of the 1998 AIAA Guidance, Navigation and Control Conference, Vol. 1, pp. 75-87, Boston, Mass., Aug. 10-12, 1998.

[4] A. Calise, S. Lee and M. Sharma, "Direct Adaptive Reconfigurable Control of a Tailless Fighter Aircraft", Proceedings of the 1998 AIAA Guidance, Navigation and Control Conference, Vol. 1, pp. 88-97, Boston, Mass., Aug. 10-12, 1998.

[5] P. Chandler, M. Pachter and M. Mears, "System Identification for Adaptive and Reconfigurable Control", Journal of Guidance, Control & Dynamics, Vol. 18, No. 3, pp. 516-524, May-June 1995.

[6] Honeywell Technology Center, Multivariable Control Design Guidelines, Report for the Program "Design Guidelines for Application of Multivariable Control Theory to Aircraft Laws", Minneapolis, Minn., 1996.

[7] Barron Associates Inc., "Self-Designing Controller Design, Simulation & Flight Test Evaluation", WL-TR-97-3095, Wright Patterson AFB, OH, September 1996.

[8] Boeing Phantom Works, "Reconfigurable Systems for Tailless Fighter Aircraft—RESTORE (First Draft)", Contract No. F33615-96-C-3612, Scientific and Technical Reports, System Design Report, CDRL Sequence No. A007, St. Louis, Mo., May 1998.

[9] J. D. Bošković and R. K. Mehra, "An Integrated Fault Management System for Unmanned Aerial Vehicles", in Proceedings of the 2nd AIAA Unmanned Aerospace Vehicles, Systems, Technologies, and Operations Conference and Workshop, San Diego, Calif., Sep. 15-18, 2003.

[10] J. D. Bošković and R. K. Mehra, "Robust Fault-Tolerant Control Design for Aircraft Under State-Dependent Disturbances", in Proceedings of the 2003 AIAA Guidance, Navigation and Control Conference, Austin, Tex., Aug. 11-14, 2003.

[11] J. D. Bošković and R. K. Mehra, "Failure Detection, Identification and Reconfiguration System for a Redundant Actuator Assembly", in Proceedings of the 5th IFAC Symposium on Fault Detection, Supervision and Safety of Technical Processes (SAFEPROCESS), Washington, D.C., Jun. 9-11, 2003.

[12] J. D. Bošković and R. K. Mehra, "An Adaptive Retrofit Reconfigurable Flight Controller", in Proceedings of the 2002 Conference on Decision and Control, Las Vegas, Nev., Dec. 10-13, 2002.

[13] J. D. Bošković and R. K. Mehra, "A Multiple Model Adaptive Flight Control Scheme for Accommodation of Actuator Failures", AIAA Journal of Guidance, Control & Dynamics, Vol 25, No. 4, pp. 712-724, July-August, 2002.

[14] J. D. Bošković and R. K. Mehra, "Failure Detection, Identification and Reconfiguration in Flight Control", presented at a Tutorial Workshop: "Fault diagnosis and fault tolerance in dynamic systems" at the IEEE International Symposium on Intelligent Control, Vancouver, British Columbia, Canada, Oct. 27-30, 2002.

[15] J. D. Bošković and R. K. Mehra, "A Decentralized Scheme for Autonomous Compensation of Multiple Simultaneous Flight-Critical Failures", in Proceedings of the 2002 AIAA Guidance, Navigation and Control Conference, Monterey, Calif., 5-8 Aug. 2002.

[16] J. D. Bošković and R. K. Mehra, "Fault Accommodation Using Model Predictive Methods", in Proceedings of the 2002 American Control Conference, Anchorage, Alaska, May 8-10, 2002.

[17] J. D. Bošković and R. K. Mehra, "An Adaptive Scheme for Compensation of Loss of Effectiveness of Flight Control Effectors", in Proceedings of the 40th IEEE Conference on Decision and Control, Orlando, Fla., December 2001.

[18] J. D. Bošković and R. K. Mehra, "A Robust Adaptive Reconfigurable Flight Control Scheme for Accommodation of Control Effector Failures", in Proceedings of the 2001 American Control Conference, pp. 1127-1132, Arlington, Va., Jun. 25-27, 2001.

[19] J. D. Bošković, S.-M. Li and R. K. Mehra, "Reconfigurable Flight Control Design Using Multiple Switching Controllers and On-line Estimation of Damage-Related Parameters", in Proceedings of the 2000 Conference on Control Applications, Anchorage, Alaska, September 2000.

[20] J. D. Bošković, S.-M. Li and R. K. Mehra, "Evaluation of the Properties of a Multiple-Model Reconfigurable Flight Controller on a 6 DOF Simulation", in Proceedings of the 2000 AIAA Guidance, Navigation and Control (GNC) Conference, Denver, Colo., August 2000.

[21] J. D. Bošković and R. K. Mehra, "Intelligent Adaptive Control of a Tailless Advanced Fighter Aircraft under Wing Damage", AIAA Journal of Guidance, Control & Dynamics, Vol. 23, No. 5, pp. 876-884, September-October 2000.

[22] J. D. Bošković and R. K. Mehra, "Stable Multiple Model Adaptive Flight Control for Accommodation of a Large Class of Control Effector Failures", in Proceedings of the 1999 American Control Conference, pp. 1920-1924, San Diego, Calif., June 1999.

[23] D. W. Vos, "Fault tolerant automatic control system utilizing analytic redundancy", U.S. Pat. No. 6,389,335, May 14, 2002.

We claim:

1. A method for controlling a dynamical system, the method comprising the steps of:
- transmitting a control signal to an actuator of said dynamical system, wherein said dynamical system comprises at least two actuators;
- receiving a sensor signal from said actuator, wherein said sensor signal consists of a measured position of said actuator and said actuator has an unmeasurable actuator rate;
- generating an estimate of said unmeasurable actuator rate;
- processing said control signal and said sensor signal without knowledge of the overall state of said dynamical system, to obtain an estimate of one or more health state parameters associated with said actuator, and adjusting said estimate of said health state parameters based on said estimate of said unmeasurable actuator rate, wherein said estimate of said health state parameters is based on a mathematical model of second-order dynamics of said actuator and said processing comprises the step of comparing said measured position with a predicted position of said actuator;
- detecting and identifying failure conditions of said actuator based on said estimate of said health state parameters; and
- generating a retrofit control signal and adding said retrofit control signal to said control signal to compensate for said failure conditions.

2. The method of claim 1, wherein each step is executed for two or more actuators.

3. The method of claim 2, further comprising the step of detecting disturbance conditions and structural damage conditions.

4. The method of claim 3, wherein said adjusting comprises the steps of generating a retrofit control signal and adding said retrofit control signal to a baseline control signal.

5. The method of claim 4, wherein said health state parameters comprise a loss-of-effectiveness (LOE) parameter and a lock-in-place (LIP) parameter.

6. The method of claim 4, further comprising the step of generating an estimate of a disturbance vector and an estimate of a damage matrix and wherein said step of detecting disturbance conditions and structural damage conditions is based on said estimate of said disturbance vector and said estimate of said damage matrix.

7. The method of claim 6, wherein said health state parameters comprise a loss-of-effectiveness (LOE) parameter and a lock-in-place (LIP) parameter.

8. The method of claim 3, wherein said health state parameters comprise a loss-of-effectiveness (LOE) parameter and a lock-in-place (LIP) parameter.

9. The method of claim 3, further comprising the step of generating an estimate of a disturbance vector and an estimate of a damage matrix and wherein said step of detecting disturbance conditions and structural damage conditions is based on said estimate of said disturbance vector and said estimate of said damage matrix.

10. The method of claim 9, wherein said health state parameters comprise a loss-of-effectiveness (LOE) parameter and a lock-in-place (LIP) parameter.

11. The method of claim 2, wherein said generating a retrofit control signal comprises the steps of:
- estimating a plurality of actuator failure signals, a structural damage signal and a disturbance signal; and
- combining said actuator failure signals, said structural damage signal and said disturbance signal to generate said retrofit control signal.

12. The method of claim 11, wherein said health state parameters comprise a loss-of-effectiveness (LOE) parameter and a lock-in-place (LIP) parameter.

13. The method of claim 2, wherein said health state parameters comprise a loss-of-effectiveness (LOE) parameter and a lock-in-place (LIP) parameter.

14. The method of claim 13, wherein said estimate of said health state parameters is based on a mathematical model of second-order dynamics of said actuator.

15. The method of claim 2, wherein said estimate is based on a mathematical model of second-order dynamics of said actuator.

16. The method of claim 15, wherein said dynamical system is a vehicle or a robot.

17. The method of claim 2, wherein said dynamical system is a vehicle or a robot.

* * * * *